Patented July 29, 1930

1,771,462

UNITED STATES PATENT OFFICE

LEON LILIENFELD, OF VIENNA, AUSTRIA

CELLULOSE SOLUTIONS AND PROCESS FOR THEIR PRODUCTION

No Drawing. Original application filed May 10, 1924, Serial No. 712,475, and in Austria June 5, 1923. Divided and this application filed February 15, 1928. Serial No. 254,625.

I have discovered that strong organic bases, particularly quaternary ammonium bases or those bases in the aqueous solution of which a highly electrolytic dissociated hydroxide is assumed to be present or mixtures of substances which are capable of forming strong organic bases, exercise a solvent action on cellulose, its conversion products and its oxidation products. This solvent action of strong organic bases is enhanced in presence of alkali.

My invention relates to a process for making cellulose solutions based on the foregoing discovery.

The fact that strong organic bases, particularly quaternary ammonium bases or those bases in the aqueous solutions of which a highly electrolytic dissociated hydroxide is assumed to be present, have a dissolving effect on cellulose or its conversion products, is not only surprising in itself. It must be described as entirely unexpected, that the solvent action of these bases even exceeds that of caustic alkalies, so far as such action exists. The more powerful solvent action of the strong organic bases is evident from the fact, for example, that whereas caustic alkali solutions are able to dissolve mercerized cellulose or bleached cellulose or bleached and mercerized cellulose or certain cellulose conversion products obtained from cellulose solutions, such as the cellulose hydrate regenerated from viscose, including viscose silk, or the cellulose conversion product obtainable from ammoniacal solutions of cupric oxide by precipitation, including copper silk and the like, only at low temperatures, such bodies from the cellulose group are dissolved even at room temperature in aqueous solutions of strong organic bases, for example a solution of 20 to 50 per cent. strength of tetraethylammoniumhydroxide or tetramethylammoniumhydroxide or phenyltrimethylammoniumhydroxide. Thus, according to the particular nature of the body from the cellulose group to be dissolved, the solvent action of the strong organic bases or of their aqueous solutions, in presence or absence of alkalies, takes effect either at room temperature or at a higher temperature or at a temperature between room temperature and 0°, or only below 0°.

Thus, for example, those conversion products which may be obtained by separation from solutions of cellulose in suitable solvents (for example strong mineral acid, ammoniacal cupric oxide, zinc chloride) or from viscose, dissolve in suitable bases or aqueous solutions thereof in presence or absence of alkali even at room temperature. Mercerized cellulose or bleached cellulose or bleached and mercerized cellulose, according to the degree of mercerizing or bleaching, dissolves either at room temperature or between room temperature and 0° or not very far below 0°, whereas slightly disintegrated or not disintegrated cellulose dissolves only below 0° in the bases or aqueous solutions thereof in presence or absence of alkalies. In every case it is easy to determine the proper temperature by a simple preliminary test, namely by mixing the cellulosic body with the desired base or solution thereof in water alone or in presence of alkali and, if no solution occurs at room temperature, cooling by stages until a solution is produced.

Hereinafter the conduct of the process is described and illustrated by examples. It is, however, expressly emphasized that it is not intended to limit the invention to the details of this description.

As parent materials for the present process the following may be named by way of example:

(1) Bleached or unbleached cellulose of every kind and in every form in which it is available;

(2) Every kind of matter containing cellulose;

(3) Those conversion products which are formed by mechanical comminution (for example grinding or shredding) of the cellulose in presence of water;

(4) Cellulose conversion products or oxidation products obtained by treating cellulose or its conversion products with oxidizing or reducing bleaching agents of every kind, irrespective of whether preliminary treatment (for example with alkalies, acids, salts or the like) has or has not preceded the bleaching operation;

(5) The conversion products obtained by heating cellulose alone or in presence of water or glycerine or the like at normal, reduced or increased pressure;

(6) The cellulose conversion products made by treating cellulose or its conversion products with caustic alkali solutions and, where necessary, removing the excess alkali solution by pressing, centrifuging or the like (mercerizing the cellulose), with or without subsequent washing, with or without subsequent treatment with a dilute acid and with or without previous or subsequent or simultaneous treatment with bleaching or oxidizing agents;

(7) Those cellulose conversion products obtained by treating cellulose with hot alkalies in presence or absence of salts;

(8) The cellulose conversion products which are separated from complete or incomplete solutions of cellulose or of its conversion products by suitable precipitating agents or other means and, if desired, purified by washing; for example from solutions or pastes of cellulose or cellulose hydrates or hydrocelluloses in ammoniacal cupric oxide or in any other solvent containing copper as a basis, or from solutions or pastes of cellulose or cellulose hydrates or hydro-celluloses in zinc halides, for example zinc chloride alone or in presence of an acid or a salt, or from solutions or pastes of cellulose or cellulose hydrates or hydro-celluloses in strong mineral acids, such as sulphuric acid, phosphoric acid, hydrochloric acid, arsenic acid and the like alone or mixed with each other or in admixture with other inorganic or organic acids or acid salts, or from crude or purified viscoses (cellulose xanthates), when decomposed spontaneously or by other means. Of all the cellulose conversion products separated from cellulose solutions the statement holds good that the nature of the precipitating agent is without influence on the present process;

(9) Artificial threads and yarns of every kind consisting of, or containing cellulose or cellulose hydrate or degraded cellulose, i. e. hydro-cellulose or oxy-cellulose, such as artificial threads made from viscose (for example viscose silk or viscose staple fibre of viscose-artificial wool) or from solutions of cellulose in cuprammonia or denitrated cellulose nitrate-silk or saponified cellulose acetate silk and the like;

(10) Cellulose conversion products which are obtained by treating, short of dissolution, cellulose or its conversion products (such as cellulose hydrates or hydro-celluloses) with solvents, such as strong mineral acids (for example parchmentizing acid) or zinc halides (for example zinc chloride or the like) or ammonical cupric oxide;

(11) Hydro-cellulose of every kind, such as are obtained, for example, by treating bleached or unbleached cellulose with dilute acids in the cold or at a raised temperature under ordinary or increased pressure or by drying in presence of acids or by treating cellulose with strong sulphuric acid of specific gravity lower than 50° Baumé in the cold, gaseous hydrochloric acid or chlorine;

(12) Oxy-celluloses of every kind;

(13) The cellulose conversion product obtainable from cellulose derivatives, such as esters or the like by scission of the molecule or by saponification, for example denitrated cellulose nitrate or saponified cellulose acetate or formate or the like.

The aforesaid conversion or oxidation products may be used in the dry, air-dry, moist or wet state. In the last two cases the percentage of water in the parent material must be taken into account when determining the strength and proportion of the solution of the base intended for the dissolution. In the succeeding portion of the description and in the claims, wheresoever the meaning admits, the expression "body of the cellulose group" or "parent material" is intended to include all the materials enumerated in the foregoing paragraph, and the expression "cellulose conversion product" is intended to comprise all the materials designated in parts (3) to (13), both inclusive, of the foregoing paragraph.

The conduct of the process is simple. It consists substantially in treating the body of the cellulose group with a preferably aqueous solution of a strong organic base, for example a quaternary ammonium base or a base in the aqueous solution of which a highly electrolytically dissociated hydroxide is assumed to be present or two or more such bases, in presence or absence of caustic alkali, preferably while stirring, at a temperature suitable for dissolving the cellulosic body concerned, until dissolution occurs. Instead of the base itself, there may be used mixtures of such substances as are capable of forming the base in question or substances capable of conversion with formation of the base in question.

If dissolution is effected while cooling, it is conducted preferably in a vessel adapted to be cooled either externally or internally or both externally and internally and having in addition a mixing, kneading or stirring device.

The solutions of the bodies from the cellulose group obtained according to the present process, if desired after previous filtering or straining or centrifuging may be used for making technical products, such as artificial threads or yarns (for example artificial silk, artificial cotton, staple fibre or the like), artificial hair, films of every kind, plastic masses, coatings of every kind upon paper, textiles, leather and the like, finishings and fillings for fabrics, sizing for yarns, book cloth, artificial leather and the like.

The solutions are easily worked up into technical products, since they are readily coagulated by suitable precipitating baths, such as inorganic or organic acids, salts, alcohols, in some cases even water, or by heat, steam and the like.

The following examples illustrate the invention, the parts being by weight:—

I. For this example there are used 10 parts or (if the parent material contains water) a proportion corresponding with 10 parts of the parent material of any of the following parent materials:

(1) Finely subdivided sulphite-cellulose;

(2) Bleached cotton, for example in the form of medicated cotton-wool;

(3) Mercerized cellulose produced, for example in the following manner. 100 parts of sulphite-cellulose in fleece or sheet form or medicated cotton wool are impregnated with 900 to 1000 parts of a caustic soda solution of 18 to 30 per cent. strength is left in the room temperature; the mass is left in the caustic soda solution for 6 up to 24 hours and then immediately washed or is first pressed or centrifuged until it weighs 200 to 300 parts and shredded or comminuted in a suitable apparatus (for example shredder, beater, willowing machine or the like) and, either directly after comminution or after standing for 1 up to 3 days at room temperature, washed with cold or hot water. The washed, mercerized cellulose is then pressed or centrifuged and dried in a vacuum or in the air or used in the centrifuged or pressed state, where desirable after previous comminution.

(4) Cellulose comminuted or ground in presence of water and produced, for example, in the following manner:—

200 parts of sulphite-cellulose in fleece or sheet form are stirred with 10 to 20 times their weight of water until the mixture is homogeneous, and after standing for several hours or several days at room temperature it is pressed or centrifuged until it weights 250 to 350 parts. The residue is ground or comminuted for several hours up to 8 days in a suitable apparatus (for example shredder, beater, willowing machine, kneading machine or the like) and, if desired dried.

(5) Cellulose previously treated with dilute mineral acids, for example according to the following directions:—100 parts of bleached, or unbleached sulphite-cellulose are boiled with 1000 to 4000 parts of hydrochloric acid of ½ per cent. strength in an open vessel for ½ up to 3 hours, then, if desired, after previous pressing or centrifuging, the product is washed and pressed or centrifuged and, if desired, dried.

(6) Viscose silk or copper silk or waste of such silks.

(7) Cellulose hydrate obtained by precipitating or treating viscose in the dissolved or undissolved state (that is to say, sulphidized alkali cellulose before its dissolution) with a dilute mineral acid, for example sulphuric acid of 5 per cent. strength, washing the precipitate and, if desired, drying.

(8) Cellulose conversion products obtained by dissolving cellulose in strong sulphuric acid and precipitating with water or dilute acids, for example according to the following directions:—

Into 1000 to 2000 parts of sulphuric acid of 60° Baumé specific gravity, cooled to −12° C., 100 parts of finely subdivided sulphite-cellulose are introduced in small portions while kneading or mixing and continuously cooling. The introduction occupies about 20 minutes. The temperature of the mass is kept at about −10° to −11° C., during the introduction. After the whole of the sulphite-cellulose is incorporated in the sulphuric acid, the product is a tough dough which may be rolled out on a glass plate and, in a thin layer, appears transparent. This dough is continuously cooled to −10° C., to −12° C., while kneading for another ½ to 1 hour, and is then kneaded with ice water, added in small portions, until it is entirely broken up. The product (if desired after previous pressing for the purpose of recovering the sulphuric acid) is washed with water until sulphuric acid can no longer be detected in the washing water and until a test portion of the body itself, boiled with water, yields no more sulphuric acid to the water. To accelerate the washing operation, the more or less coarse product may be triturated or ground in the moist state once or several times during the washing. The washed body is now pressed or centrifuged, if necessary again triturated or ground and used either in the wet state or after having been dried in a vacuum or in the air.

Whichever of the foregoing parent materials is used it is mixed with an aqueous solution of tetramethylammoniumhydroxide or tetraethylammoniumhydroxide or phenyltrimethylammoniumhydroxide of such concentration, that the mixture contains 10 parts of air-dry parent material and 190 to 240 parts of a solution of one of these bases of 20 to 50 per cent. strength, whereupon the mass is stirred at room temperature until it is homogeneous.

The result in the case of parent material 1, 2, 3 and 4 is merely a more or less appreciable swelling, whereas in the case of parent materials 5, 6, 7 and 8 dissolution occurs to a considerable extent.

Then, preferably while stirring or kneading, the mass is cooled to −8° to −11° C., and kept at this temperature for some seconds up to 30 minutes.

Under the action of the cold dissolution occurs in the first four cases; in the last four improvement, that is to say completion of the solution already begun. The solutions are viscous, but liquid, and may be freed from any undissolved constituents that may be present by straining, filtering or centrifuging.

Spread in thin layers on glass plates and treated with a suitable precipitating bath (for example dilute sulphuric acid), these solutions yield films which are transparent and flexible after washing and drying. They may also be worked up into artificial threads, such as artificial silk, by spinning into suitable precipitating baths (for example dilute sulphuric acid or dilute sulphuric acid in admixture with a salt).

II. The mode of operation is as in example I, except that for dissolving the 10 parts of the parent material there are used 190 to 240 parts of a solution of 10 to 30 per cent. strength of tetramethylammoniumhydroxide or tetraethylammoniumhydroxide or phenyltrimethylammoniumhydroxide in caustic soda solution of 5 to 10 per cent. strength.

The presence of the caustic soda enhances the solvent action of the bases. For the rest, the result is roughly as in Example I.

This case is a division of my application Serial No. 712,475, filed May 10, 1924.

Having described my invention what I claim is:

1. The process of making cellulosic solutions which comprises treating a body of the cellulose group in an undissolved state with a strong organic base.

2. The process of making cellulosic solutions which comprises treating a body of the cellulose group in an undissolved state with a strong organic base at a low temperature.

3. The process of making cellulosic solutions which comprises treating a body of the cellulose group in an undissolved state with an aqueous mixture containing a strong organic base.

4. The process of making cellulosic solutions which comprises treating a body of the cellulose group in an undissolved state with a liquid containing a strong organic base.

5. The process of forming a solution of a body of the cellulose group which comprises treating the said body in an undissolved state with a quaternary ammonium hydroxide.

6. The process of forming a solution of a body of the cellulose group which comprises treating the said body in an undissolved state with a quaternary ammonium hydroxide in the presence of an alkali.

7. The process of forming a solution of a body of the cellulose group which comprises treating the said body with a quaternary ammonium hydroxide in the presence of an aqueous solution of hydroxide of an alkali metal.

8. The process of forming a solution of a body of the cellulose group which comprises treating the said body with a liquid comprising a quaternary ammonium hydroxide.

9. The process of forming a cellulosic solution which comprises treating a water insoluble cellulosic body with a strong organic base.

10. The process of forming a cellulosic solution which comprises treating a water insoluble cellulosic body with a strong organic base at a low temperature.

11. The process of forming a cellulosic solution which comprises treating a water insoluble cellulosic body with an aqueous mixture including a strong organic base.

12. The process of forming a cellulosic solution which comprises treating a water insoluble cellulosic body with an aqueous mixture including a strong organic base at a low temperature.

13. The process of forming a cellulosic solution which comprises treating a water insoluble cellulosic body with a quaternary ammonium hydroxide.

14. The process of forming a cellulosic solution which comprises treating a water insoluble cellulosic body with a quaternary ammonium hydroxide at a low temperature.

15. The process of forming a cellulosic solution which comprises treating a water insoluble cellulosic body with an aqueous mixture containing a quaternary ammonium hydroxide.

16. A solution of a water insoluble cellulosic body in a strong organic base.

17. A solution of a water insoluble cellulosic body in an aqueous mixture containing a strong organic base.

18. A solution of a body of the cellulose group in a quaternary ammonium hydroxide.

19. A solution of a body of the cellulose group in an aqueous mixture including a quaternary ammonium hydroxide.

20. A solution of a body of the cellulose group in an aqueous mixture containing quaternary ammonium hydroxide and alkali hydroxide.

In testimony whereof I affix my signature.

Dr. LEON LILIENFELD.